Aug. 26, 1958  A. K. DRAKE  2,849,623
SYSTEM FOR COMPENSATING FOR AMBIENT RADIATION
Filed March 2, 1953
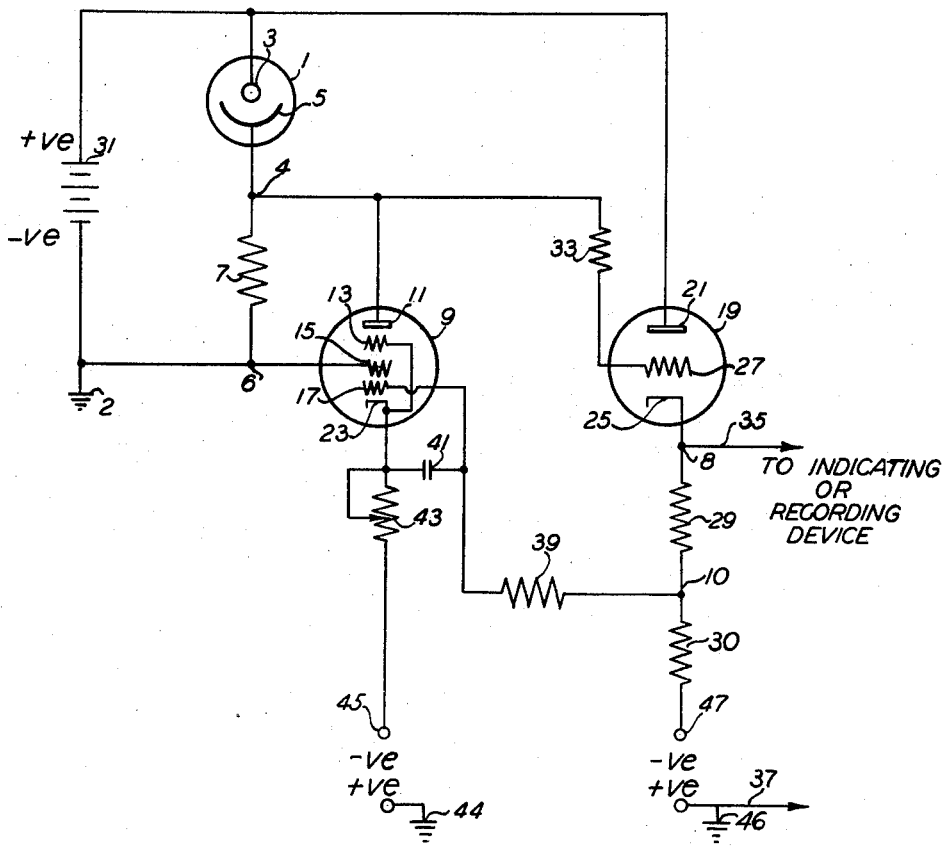
INVENTOR.
ARTHUR K. DRAKE
BY
*Rines and Rines*
ATTORNEYS

United States Patent Office 2,849,623
Patented Aug. 26, 1958

2,849,623
SYSTEM FOR COMPENSATING FOR AMBIENT RADIATION

Arthur K. Drake, Braintree, Mass., assignor to Edgerton, Germeshausen and Grier, Inc., Boston, Mass., a corporation of Massachusetts Application March 2, 1953, Serial No. 339,867

6 Claims. (Cl. 250—214)

The present invention relates to systems for compensating for ambient radiation, and more particularly, to systems for responding to transient radiation signals in the presence of ambient signals.

One of the principal difficulties encountered in trying to detect transient signals resides in the masking effect in the detecting apparatus of steady-state or slowly varying co-existing signals. As will later be more fully explained, the present invention is of broader utility than merely for ambient radiation compensation, but in view of the important application of the invention to the problem of radiation measurements, the invention will hereinafter be described, for illustrative purposes, in connection with this particular application.

In its basic form, a radiation detecting system comprises a radiation detector connected in circuit with a source of voltage and a load. An indication of the radiation impinging upon the detector may be measured in the load. It is desired that this load have appreciable impedance in order that a high voltage output signal may be developed there-across. Substantially all of the voltage in the circuit will then be developed across the load alone. Ambient radiation impinging upon the detector, therefore, will maintain a high steady-state or slowly varying voltage across the load. When a transient radiation signal occurs, which it is desired to detect, it can not produce an appreciable effect in the circuit since, as before stated, substantially all the voltage is developed across the load and little across the detector upon which the transient signal impinges. It is thus not possible to detect such transient signals in the voltage developed across the load. If, moreover, the value of the load impedance be reduced to a value low compared to the detector impedance, thereby to develop more voltage across the detector, then little output signal voltage can be obtained across the load.

This problem of detecting transient radiation signals through co-existing ambient or slowly-varying signals may ideally be solved by providing a load or effective load that can present a low impedance to steady-state or slowly varying signals and simultaneously present a high impedance to transient signals. The steady-state or slowly varying signals would then develop little or no voltage across the load, while the transient signals develop a high voltage. In accordance with the present invention, such an effective load is provided with the aid of a complex supplemental circuit that by-passes steady-state or slowly varying signals across the load and yet insures that transient signals pass through the load.

One of the principal objects of the present invention, therefore, is to provide a new and improved system for compensating for the presence of steady-state or slowly varying radiation signals, while permitting the detection of transient signals.

Another object is to provide a new and improved radiation detector.

A further object is to provide a system for distinguishing between steady-state or slowly varying voltage signals and rapidly varying or transient voltage signals.

Other and further objects will be explained hereinafter and will be more fully pointed out in the appended claims.

The invention will now be described in connection with the accompanying drawing the single figure of which is a schematic circuit diagram of a preferred form of the invention. A radiation detector, such as a photocell 1, having an anode 3 and a cathode 5, is shown connected in series circuit with a conventional source of supply voltage of any desired type, illustrated for purposes of simplicity as a battery 31, and a load 7. The load 7 is preferably a resistor of relatively high impedance the lower terminal 6 of which may be connected to the negative terminal of the source of supply voltage 31 at a ground connection 2. The upper terminal 4 of the load 7 is connected to the cathode 5 of the detector 1, the anode 3 of which is connected to the positive terminal of the voltage source 31. If this were the complete circuit, as before explained, there would be developed across the high-value resistor 7, substantially all of the voltage of the source 31, and ambient radiation signals produced in the circuit by radiation impinging upon the detector 1 would be developed across the load 7. A transient signal would, however, be masked. Were the value of the load 7 reduced to a low resistance value, on the other hand, large output voltages could not even be developed across the load.

In accordance with the present invention, therefore, there is connected in shunt with the load 7, a supplemental circuit comprising a pentode electron or vacuum tube 9, a cathode-follower triode electron or vacuum tube 19 and a frequency-selective time-constant-controlled network 39, 41, 43. This supplemental circuit, as will now be explained, by-passes the ambient signals across the load and permits only the transient signals to pass through the load and thus to be detected.

The pentode 9 is provided with an anode or plate 11, a suppressor electrode 13, a screen-grid electrode 15, a control-grid electrode 17 and a cathode 23 connected to the suppressor electrode 13. As will later be evident, the constant-current properties of the pentode 9 are very desirable in connection with the present invention, though other types of electron amplifier tubes could be employed. The plate 11 is connected to the upper terminal 4 of load 7 and the screen-grid electrode 15 is connected to lower terminal 6, grounded at 2. The cathode 23 is connected to a terminal 45 of a negative bias-voltage source through a variable resistor 43, the positive terminal of which may be grounded at 44. The cathode 23 is also connected by the condenser 41 to the control-grid electrode 17. The plate 11 of the pentode 9 is also connected through a resistor 33 to the control-grid electrode 27 of the cathode-follower tube 19. The plate 21 of the cathode follower 19 is connected to the positive terminal of the supply voltage source 31, and the cathode 25 of the cathode follower is connected through a cathode load resistor 29 and voltage-dividing resistor 30, to a further negative-bias voltage source terminal 47, the positive terminal of which may be grounded at 46. Output conductors 35 and 37, connected to the top terminal 8 and ground 46, respectively, feed the output voltage of the cathode follower to any desired metering, indicating or recording apparatus, not shown. The lower terminal 10 of the cathode load 29 is also connected through a resistor 39 to the control-grid electrode 17 of the pentode 9.

The operation of the circuit appears to be somewhat as follows. Radiation falling upon the detector 1 produces current in the series-connected circuit comprising the source 31, the detector 1 and the load 7. The upper terminal 4 of the load 7 thus starts to rise in voltage with respect to the grounded lower terminal 6 as a voltage is developed in response to this current flow through the load 7. This rise in voltage at the terminal 4 is conveyed by way of the resistor 33 to the control-grid electrode 27 of the cathode-follower 19 causing increased conduction in the cathode-follower 19 between its cathode 25 and its plate 21 in the circuit traceable from the cathode 25, through the cathode load 29 and 30 to the negative bias terminal 47, to the positive grounded bias terminal 46, by way of ground to the grounded terminal 2, through the supply voltage source 31, to the plate 21. This increased conduction will cause the potential of the cathode 25 to rise, also, thus raising the voltage at the terminal 10 of the cathode load 29 and 30. The rise in voltage at the terminal 10 commences to charge the condenser 41 in the circuit traceable from the terminal 10, through resistor 39, through the condenser 41, through the resistor 43, to the negative bias terminal 45, to the positive grounded terminal 44, by way of ground to the positive terminal 46, thence through the bias source to the negative terminal 47, and back to the lower terminal 10 of the cathode load 29. The time constant of the network comprising the resistors 39 and 43 and the condenser 41 is made sufficiently large, as by adjusting the tap on the resistor 43, that slowly varying voltages, such as may be produced by ambient light impinging upon the detector 1, can charge the condenser 41. Since the condenser 41, as before stated, is also connected between the cathode 23 and the control-grid electrode 17 of the pentode 9, the voltage on the control-grid electrode 17 will correspondingly vary with the slowly varying voltage at the lower terminal 10 of the cathode load 29. The pentode 9 will correspondingly conduct, providing a bypass from the upper terminal 4 of the resistive load 7 to ground in the circuit traceable from the upper terminal 4 of the load 7 to the plate 11 of the pentode 9, through the pentode 9 to its cathode 23, and through the resistor 43 to the negative terminal 45 and the positive grounded terminal 44 of the pentode bias supply source. Since the grounded terminal 44 is connected through the ground 2 to the lower terminal 6 of the resistive load 7, the pentode 9 is thus effectively a low impedance by-pass in shunt or parallel relation with the load 7. Slowly varying or relatively steady-state signals, therefore, such as those produced by ambient or slowly varying radiation, will thus not pass through the load 7, but will be by-passed or diverted across the load 7 through the pentode 9. Current in the resistive load 7 will, therefore, be very low and the voltage at the upper terminal 4 of the resistive load 7 will, in view of the constant-current properties of the pentode, tend to remain substantially constant under such conditions of slowly changing radiation signals. It follows, moreover, that the voltage between the output conductors 35 and 37, connected between the cathode-follower cathode and ground, will similarly remain substantially constant.

When, on the other hand, a rapidly changing or transient signal falls upon the detector 1, rapidly tending to raise the voltage at the upper terminal 4 of the resistive load 7, the resulting rapid voltage across the cathode load 29 and 30 of the cathode follower 19 will be conveyed by the conductors 35 and 37 to the desired indicating or recording devices, not shown. The long time constant of the network 39, 41, 43, cannot, of course, respond to such a rapid signal and the control electrode 17 of the pentode 9 remains unaffected by or insensitive to the existence of such a transient signal. The transient signal cannot thus be reproduced in or pass through, the pentode 9, which thus presents a high impedance thereto, so that substantially all of the transient signal is forced to pass through the resistive load 7 only, and it will thus appear, also, across the cathode-follower cathode load 29 and 30.

Distinguishment between transient or rapidly varying and ambient or steady-state signals is thus effected and, in addition, transients can be strongly detected even in the presence of ambient or other slowly varying signals. Instead of the photocell detector 1, which is particularly useful with visible or invisible light rays, it is evident that other types of radiation detectors, such as charged-particle radiation counters and the like may also similarly be employed in connection with the present invention. It is also to be understood that instead of a radiation detector 1, any other source of any other type of transient and steady-state or slowly varying signal voltages may be utilized since the invention is equally operable no matter what the source of the voltages applied to the load 7.

Further modifications will occur to those skilled in the art, and all such are considered to fall within the spirit and scope of the invention as defined in the appended claims.

What is claimed is:

1. A radiation detecting system having, in combination, an electric circuit comprising a radiation detector, a source of energy and a first load connected in series relation in order to produce a voltage from the source across the first load in response to radiation impinging upon the radiation detector, an electron tube having an anode, a control electrode and a cathode, means for connecting the anode and the control electrode in parallel with the radiation detector, a cathode load connected to the cathode, a further electron tube having an anode, a cathode and a pair of further electrodes, means for connecting the further electron-tube anode and one of the further electrodes in parallel with the first load, a time-constant-controlled electric network, means for connecting the network from the said cathode load to between the other further electrode and the cathode of the further electron tube, the parameters of the network providing a time constant of value sufficiently large to present a low-impedance to steady-state or slowly varying voltages from the said cathode load in order correspondingly to control the further electron tube, while presenting a high impedance to rapidly varying voltages so that the further electron tube may be insensitive to the same.

2. Apparatus of the character described having, in combination, a load, means including a device such as a radiation detector for supplying steady-state or slowly varying currents and rapidly varying currents to said load, a variable conduction electronic device connected across said load, and a control circuit including frequency selective means connected to said load for varying the conductivity of said electronic device only in response to steady-state or slowly varying currents to by-pass the same around said load, but not said rapidly varying currents.

3. The apparatus of claim 2, said frequency selective means comprising a time constant network having parameters which present a high impedance to said rapidly varying signals and a low impedance to said steady-state or slowly varying signals.

4. The apparatus of claim 2, said supply means comprising a photoelectric cell.

5. The apparatus of claim 2, said variable conduction electronic device comprising a constant-current-operated amplifier.

6. The apparatus of claim 5, said control circuit including a cathode follower circuit having its input connected to said load and its output connected to the input of said amplifier through a path including said frequency selective means, and output terminals connected to the cathode load of said cathode follower circuit.

References Cited in the file of this patent

UNITED STATES PATENTS 2,234,011    Shepard _____ Mar. 4, 1941